(12) United States Patent
Kitano (10) Patent No.: US 11,482,405 B2
(45) Date of Patent: Oct. 25, 2022

(54) MASS SPECTROMETRY DEVICE AND MASS SPECTROMETRY METHOD

(71) Applicant: SHIMADZU CORPORATION, Kyoto (JP)

(72) Inventor: Riki Kitano, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/045,350

(22) PCT Filed: Mar. 8, 2019

(86) PCT No.: PCT/JP2019/009391
§ 371 (c)(1),
(2) Date: Oct. 5, 2020

(87) PCT Pub. No.: WO2019/193926
PCT Pub. Date: Oct. 10, 2019

(65) Prior Publication Data
US 2021/0028001 A1 Jan. 28, 2021

Related U.S. Application Data

(60) Provisional application No. 62/652,973, filed on Apr. 5, 2018.

(51) Int. Cl.
*H01J 49/00* (2006.01)
*H01J 49/04* (2006.01)
(Continued)

(52) U.S. Cl.
CPC ........ *H01J 49/0422* (2013.01); *G01N 27/622* (2013.01); *G01N 30/72* (2013.01)

(58) Field of Classification Search
CPC .. H01J 49/0422; H01J 49/145; G01N 27/622; G01N 30/72; G01N 30/7206
(Continued)

(56) References Cited

U.S. PATENT DOCUMENTS

| 2006/0054806 A1* | 3/2006 | Yamada | H01J 49/168 250/288 |
| 2009/0294660 A1* | 12/2009 | Whitehouse | H01J 49/168 250/288 |

(Continued)

FOREIGN PATENT DOCUMENTS

| JP | 2008-14788 A | 1/2008 |
| JP | 2012-069516 A | 4/2012 |
| JP | 3210394 U | 5/2017 |

OTHER PUBLICATIONS

Colleen K. Van Pelt et al., "Acetonitrile Chemical Ionization Tandem Mass Spectrometry to Locate Double Bonds in Polyunsaturated Fatty Acid Methyl Esters", Anal. Chem., 1999, pp. 1981-1989, vol. 71.
(Continued)

*Primary Examiner* — Michael Maskell
(74) *Attorney, Agent, or Firm* — Sughrue Mion, PLLC (57) ABSTRACT

A mass spectrometry device that is provided with an ionization unit and ionizes, by the ionization unit, a sample separated by a separation column, subjects the sample to mass separation and detect ions obtained in the mass separation, includes: a gas introduction unit that introduces a first gas obtained by vaporizing a liquid into the ionization unit using a second gas, wherein: the ionization unit ionizes the sample by reacting ions obtained by ionizing the first gas with the sample.

14 Claims, 8 Drawing Sheets

(51) Int. Cl.
*G01N 27/622* (2021.01)
*G01N 30/72* (2006.01)

(58) Field of Classification Search
USPC .................................... 250/281, 282, 288
See application file for complete search history.

(56) References Cited

U.S. PATENT DOCUMENTS

2012/0049055 A1* 3/2012 Hashimoto ............. H01J 49/04
250/282
2012/0312980 A1* 12/2012 Whitehouse ........ H01J 49/0459
250/282

OTHER PUBLICATIONS

Harry F. Prest et al., "Use of Liquid Reagents for Positive Chemical Ionization on the 5973 MSD", Report, No. 5968-5707E, Agilent Technologies Company, Dec. 1999, pp. 1-6.
International Search Report of PCT/JP2019/009391 dated May 28, 2019 [PCT/ISA/210].
Written Opinion of PCT/JP2019/009391 dated May 28, 2019 [PCT/ISA/237].
Notice of Reasons for Refusal dated Oct. 26, 2021 from the Japanese Patent Office in Japanese Application No. 2020-511669.
Office Action dated May 10, 2022 issued by the Japanese Patent Office in Japanese Application No. 2020-511669.

* cited by examiner

MASS SPECTROMETRY DEVICE AND MASS SPECTROMETRY METHOD

CROSS REFERENCE TO RELATED APPLICATIONS

This application is a National Stage of International Application No. PCT/JP2019/009391, filed Mar. 8, 2019, claiming priority to U.S. Provisional Patent Application No. 62/652,973, filed Apr. 5, 2018, the contents of all of which are incorporated herein by reference in their entirety.

TECHNICAL FIELD

The present invention relates to a mass spectrometry device and a mass spectrometry method.

BACKGROUND ART

In analysis using mass spectrometry device such as a gas chromatograph-mass spectrometer (GC-MS), a sample is ionized by chemical ionization. In chemical ionization, reaction ions generated by ionization of a reagent gas introduced into an ionization unit including an ion source react with molecules constituting a sample (hereinafter referred to as sample molecules) to ionize sample molecules. Chemical ionization has characteristics that sample molecules are difficult to dissociate and ions to which electrons or the like are added are likely to be generated and the like, and analysis can be performed using these characteristics.

In chemical ionization, a combustible gas such as methane or isobutane is preferably used as a reagent gas. However, there are problems that it is difficult to install a cylinder containing a combustible gas from the viewpoint of safety, and it is difficult to procure a combustible gas in a view of cost. Therefore, it has been proposed to use liquid-phase acetonitrile or the like as a supply source of a reagent gas (Non-Patent Literature 1 and Non-Patent Literature 2).

CITATION LIST

Non-Patent Literature

NPTL1: Pelt CKV, Brenna JT. "Acetonitrile chemical ionization tandem mass spectrometry to locate double bonds in polyunsaturated fatty acid methyl esters" Analytical Chemistry, (USA), American Chemical Society, May 15, 1999, Volume 71, Issue 10, pp. 1981-1989

NPTL2: Prest HFP, Perkins PD. "Use of Liquid Reagents for Positive Chemical Ionization on the 5973 MSD", (on-line), 1999, Agilent Technologies Company, (Jan. 29, 2019 search), Internet <URL: http://faculty.fortlewis.edu/milofsky_r/GC-MS-CI.pdf>

SUMMARY OF INVENTION

Technical Problem

However, a reagent gas obtained by vaporizing a liquid phase substance has a lower boiling point and lower vapor pressure than the gas phase reagent gas at room temperature and atmospheric pressure, so that it is difficult to efficiently introduce it into an ionization unit.

Solution to Problem

The 1st aspect of the present invention relates to a mass spectrometry device that is provided with an ionization unit and ionizes, by the ionization unit, a sample separated by a separation column, subjects the sample to mass separation and detect ions obtained in the mass separation, comprising: a gas introduction unit that introduces a first gas obtained by vaporizing a liquid into the ionization unit using a second gas, wherein: the ionization unit ionizes the sample by reacting ions obtained by ionizing the first gas with the sample.

The 2nd aspect of the present invention relates to a mass spectrometry method that performs mass spectrometry, by a mass spectrometry device provided with an ionization unit, of a sample separated by a separation column and introduced into the ionization unit, the method comprising: introducing a first gas obtained by vaporizing a liquid into the ionization unit using a second gas, wherein: in the ionization unit, the sample is ionized by the reaction between the ions obtained by ionizing the first gas and the sample.

Advantageous Effects of Invention

According to the present invention, a reagent gas obtained by vaporizing a liquid phase substance can be efficiently introduced into an ionization unit.

BRIEF DESCRIPTION OF DRAWINGS

FIGS. 4(A) to 4(C) is a mass spectrum including ion peaks obtained by electron ionization of benzophenone.

FIGS. 5(A) to 5(C) is an enlarged view of the mass spectrum including ion peaks obtained by electron ionization of benzophenone.

FIGS. 7(A) and 7(B) is a graph showing types of pressurizing gas and ratios of intensity of a peak corresponding to m/z 183 to intensity of a peak corresponding to m/z 182 in the obtained mass spectrum.

DESCRIPTION OF EMBODIMENTS

Hereinafter, an embodiment for carrying out the present invention will be described with reference to the drawings.

First Embodiment

The mass spectrometry device according to the present embodiment introduces a gas obtained by vaporizing a pressurized liquid into an ionization unit. The introduced gas can be used as a reagent gas at the time of chemical ionization.

Mass Spectrometry Device

Figure 1:
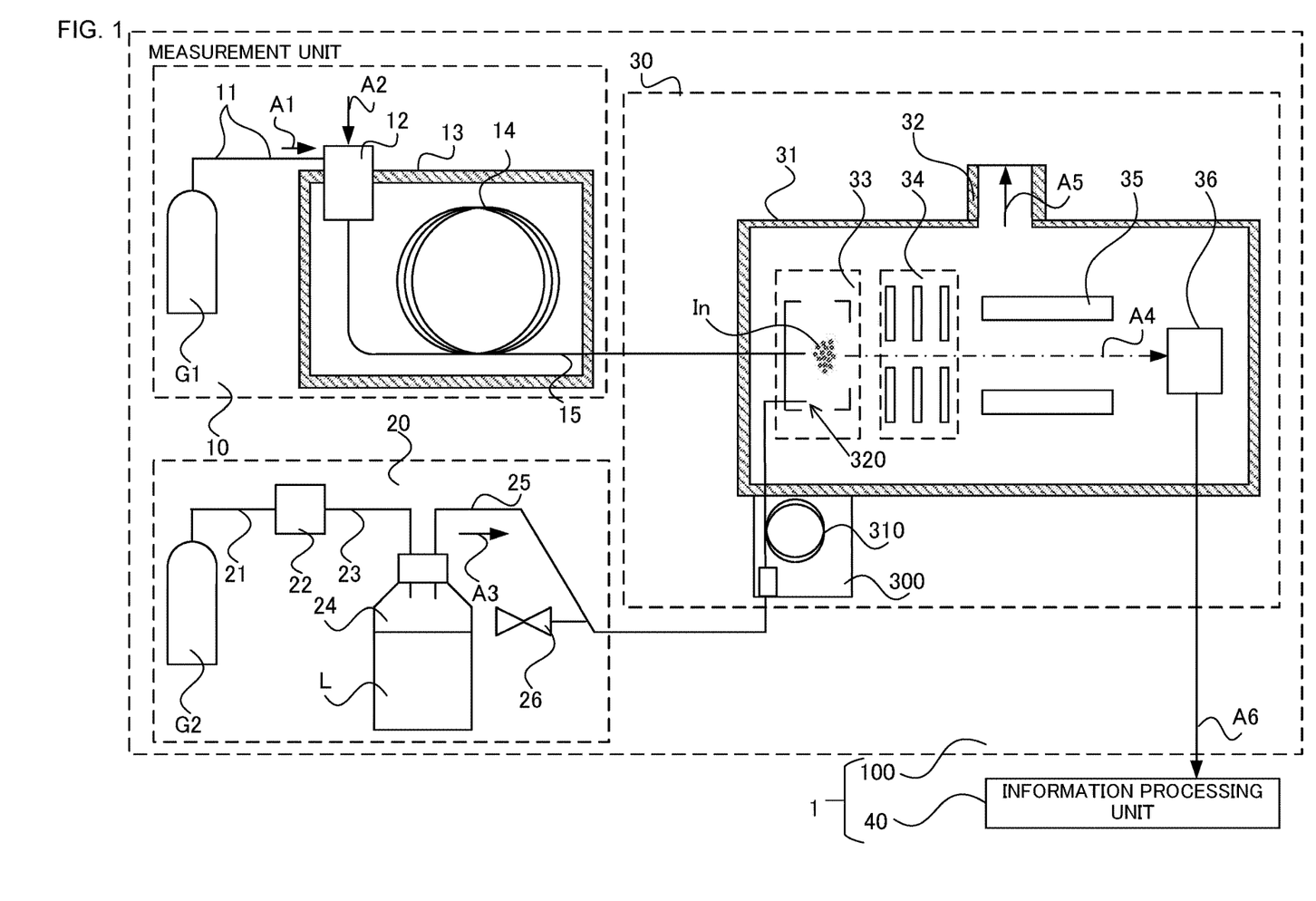
FIG. 1 is a conceptual diagram showing a configuration of a mass spectrometry device according to one embodiment.

FIG. 1 is a conceptual diagram showing a configuration of the mass spectrometry device according to the present embodiment. The mass spectrometry device 1 is a gas chromatograph-mass spectrometer (hereinafter referred to as GC-MS), and includes a measurement unit 100 and an information processing unit 40. The measurement unit 100 includes a gas chromatograph 10, a reagent gas supply unit 20, and a mass spectrometry unit 30.

The gas chromatograph 10 includes a carrier gas supply source G1, a carrier gas flow passage 11, a sample introduction unit 12, a column temperature adjustment unit 13, a separation column 14, and a sample gas introduction pipe 15. The reagent gas supply unit 20 includes a pressurizing gas supply source G2, a first pressurizing gas passage 21, a pressure adjustment unit 22, a second pressurizing gas passage 23, a liquid container 24 that stores liquid L, a reagent gas flow passage 25, and a safety valve 26. The mass spectrometry unit 30 includes a vacuum container 31, an exhaust port 32, an ionization unit 33 that ionizes a sample to be analyzed to generate ions In, an ion adjustment unit 34, a mass separation unit 35, a detection unit 36, and a reagent gas introduction unit 300. The reagent gas introduction unit 300 includes a capillary tube 310 that is a resistance tube, and a reagent gas introduction port 320.

The measurement unit 100 separates each component of the sample (hereinafter referred to as a sample component) and detects each separated sample component.

The gas chromatograph 10 functions as a separation unit that separates sample components based on their physical or chemical characteristics. When introduced into the separation column 14, the sample is in a form of gas or gaseous, which is called sample gas.

The carrier gas supply source G1 includes a container that stores the carrier gas, and supplies the carrier gas to the carrier gas flow passage 11. The carrier gas flow passage 11 has a first end that is one end thereof connected to the carrier gas supply source G1 so that the carrier gas can flow, and a second end that is the other end thereof connected to the sample introduction unit 12 so that the carrier gas can be introduced thereto. The carrier gas introduced from the carrier gas supply source G1 into the carrier gas flow passage 11 is adjusted in flow rate and the like by a carrier gas flow rate control unit (not shown) disposed in the carrier gas flow passage 11, and then introduced into the sample introduction unit 12 (arrow A1). The sample introduction unit 12 is provided with a chamber such as a sample vaporization chamber for storing the sample, in which the sample injected by an injector such as a syringe or an autosampler (not shown) is temporarily stored. In the case where the sample is in a form of liquid, the sample is vaporized into a sample gas and then is introduced into the separation column 14 (arrow A2).

The separation column 14 includes a column such as a capillary column. The temperature of the separation column 14 is controlled to, for example, several hundreds ° C. or less by the column temperature adjustment unit 13 including a column oven or the like. The respective components of the sample gas are separated based on their partition coefficients and the like between a mobile phase and a stationary phase of the separation column 14, and the respective components of the separated sample gas are eluted from the separation column 14 at different timings to be introduced into the ionization unit 33 of the mass spectrometry unit 30 through the sample gas introduction pipe 15.

The reagent gas supply unit 20 supplies the reagent gas that is to be introduced into the ionization unit 33 to the reagent gas introduction unit 300 of the mass spectrometry unit 30. The reagent gas supply unit 20 pressurizes the liquid L placed in the liquid container L to efficiently supply the reagent gas obtained by vaporizing the liquid L to the reagent gas introduction unit 300.

The pressurizing gas supply source G2 includes a container that stores the pressurizing gas that pressurizes the liquid L, and the pressurizing gas supply source G2 supplies the pressurizing gas to the first pressurizing gas passage 21.

The type of the molecule constituting pressurizing gas is not particularly limited as long as the molecule does not adversely affect mass spectrometry due to, for example, reaction with the sample, the liquid L, or the reagent gas. The pressurizing gas is preferably a gas having a composition different from that of the reagent gas. An inert gas such as argon, helium or nitrogen can be included in the pressurizing gas. From the viewpoint of efficiently performing chemical ionization, the pressurizing gas is preferably argon or nitrogen.

With respect to the first pressurizing gas passage 21, the first end that is one end thereof is connected to the pressurizing gas supply source G2 so that the pressurizing gas can flow therethrough into the pressurizing gas supply source G2, and the second end that is the other end thereof is connected to the pressure adjustment unit 22 so that the pressurizing gas can be introduced therethrough into the pressure adjustment unit 22. The pressurizing gas is introduced from the pressurizing gas supply source G2 to the pressure adjustment unit 22 through the first pressurizing gas passage 21.

The pressure adjustment unit 22 includes a pressure regulator and controls the pressure of the pressurizing gas. The pressure adjustment unit 22 is controlled by a pressure control unit 511 described later. The pressure adjustment unit 22 adjusts the pressure of the pressurizing gas to a pressure higher than atmospheric pressure. If the pressure of the pressurizing gas is too high, it will adversely affect the flow passage or the device into which the pressurizing gas is introduced, and the partial pressure of the reagent gas among the gases introduced into the ionization unit 33 by the reagent gas introduction unit 300 will be low and thus the efficiency of introducing the reagent gas may be reduced. Therefore, as will be described later in Variation 1, the pressure of the pressurizing gas is adjusted so that the difference between the pressure of the pressurizing gas and the atmospheric pressure is 500 kPa or less.

With respect to the second pressurizing gas passage 23, the first end that is one end thereof is connected to the pressure adjustment unit 22 so that the pressurizing gas can flow therethrough into the pressure adjustment unit 22, and the second end that is the other end thereof is connected to the liquid container 24 so that the pressurizing gas can be introduced therethrough into inside of the liquid container 24. The second end is located at the position above the water surface of the liquid L placed in the liquid container 24. The pressurizing gas is introduced from the pressure adjustment unit 23 into the liquid container 24 through the second pressurizing gas passage 23.

The liquid container 24 is not particularly limited in type, shape, material, etc. as long as it can store the liquid L and can be sealed with introduced pressurizing gas inside to maintain the pressure thereof. As the liquid container 24, for example, a beaker, a vial, or a bottle can be used.

The composition of the liquid L is not particularly limited as long as the gas generated by the vaporization of the liquid L can be used as the reagent gas for the chemical ionization of the sample. It is preferable that the molecule constituting the liquid L has, for example, a lower proton affinity than the sample molecule to be analyzed from the viewpoint of efficient chemical ionization. The liquid L is preferably constituted to include a liquid phase substance at room temperature and atmospheric pressure. From these viewpoints, the liquid L is preferably an organic solvent, and the liquid L can be, for example, methanol, acetonitrile, acetone, hexane, isopropanol, cyclohexane or toluene. From the viewpoint of efficiently performing chemical ionization, the liquid L is preferably methanol, acetone, hexane or isopropanol, more preferably methanol having a relatively high vapor pressure and particularly a low proton affinity.

It is to be noted that, the temperature of the liquid container 24 may be adjusted using a temperature adjusting device (not shown), and a substance that is in a liquid phase at the adjusted temperature may be used as the liquid L.

With respect to the reagent gas flow passage 25, the first end that is one end thereof is connected to the liquid container 24 so that the reagent gas can flow therethrough into the liquid container 24, and the second end that is the other end thereof is connected to the reagent gas introduction unit 300 of the mass spectrometry unit 30 so that the reagent gas can be introduced therethrough into the reagent gas introduction unit 300 of the mass spectrometry unit 30. The first end is located at the position above the water surface of the liquid L placed in the liquid container 24. The reagent gas generated by vaporizing the liquid L inside the liquid container 24 is introduced from the liquid container 24 into the reagent gas introduction unit 300 through the reagent gas flow passage 25. In this way, the vaporized liquid L moves along with the flow of the pressurizing gas and is introduced into the reagent gas introduction unit 300 and the ionization unit 33. The pressurizing gas also functions as a gas for carrying the reagent gas.

The safety valve 26 is a valve for preventing the pressure of the reagent gas in the reagent gas flow passage 25 from becoming higher than a predetermined pressure exceeding the atmospheric pressure. The safety valve 26 is installed in the middle of the reagent gas flow passage 25. This predetermined pressure is set to a pressure that does not adversely affect the flow passage or the device into which the reagent gas is introduced.

It is to be noted that, a valve can be installed in any flow passage or device, such as the second pressurizing gas passage 23 or the reagent gas introduction unit 300, into which the pressurizing gas or the reagent gas is introduced, to prevent a pressure inside the flow passage or the device from becoming higher than a predetermined pressure.

The reagent gas introduction unit 300 adjusts the pressure and flow rate of the reagent gas introduced from the reagent gas supply unit 20, and introduces the reagent gas into the ion source 33. With respect to the capillary tube 310 of the reagent gas introducing unit 300, the first end that is one end thereof is connected to the reagent gas flow passage 25 so that the reagent gas can flow therethrough, and the second end that is the other end thereof is connected to the reagent gas introduction port 320 so that the reagent gas can flow therethrough to the reagent gas introduction port 320. The length and inner diameter of the capillary tube 310 are not particularly limited as long as chemical ionization is caused by the reagent gas introduced into the ion source 33 and the ions In obtained by this chemical ionization can be detected with desired accuracy. The reagent gas introduction port 320 is opened inside the ionization chamber (not shown) of the ionization unit 33 so that the reagent gas can be introduced into the ionization unit 33.

The mass spectrometry unit 30 includes a mass spectrometer, ionizes the sample introduced into the ionization unit 33, and mass-separates and detects the ions In generated through this ionization. The path of the ions In that is derived from the sample and is generated by the ionization unit 33 is schematically shown by an arrow A4.

If the ions In can be mass-separated with desired accuracy and the ions obtained by this mass separation can be detected, the type of mass spectrometer constituting the mass spectrometry unit 30 is not particularly limited, and a mass spectrometer including any one or more types of mass analyzers can be used. Further, in the mass separation unit 35, addition of an atom or atomic group to the ion In or dissociation of the ion In may be performed. The "ion obtained by mass separation" also includes ions obtained by this addition, dissociation or the like.

The vacuum container 31 of the mass spectrometry unit 30 includes the exhaust port 32. The exhaust port 32 is connected to a vacuum evacuation system (not shown) so as to being able to evacuate. This vacuum evacuation system includes a pump capable of realizing a high vacuum of $10^{-2}$ Pa or less, such as a turbo molecular pump, and its auxiliary pump. In FIG. 1, evacuation of the gas inside the vacuum container 31 is schematically shown by an arrow A5.

The ionization unit 33 of the mass spectrometry unit 30 includes an ion source, and ionizes the sample introduced into the ionization unit 33 by chemical ionization to generate ions In. This ion source includes an ionization chamber, a thermoelectron generation filament, a trap electrode (not shown), and the like. The thermoelectrons generated by the thermoelectron generation filament are accelerated by the voltage applied to the trap electrode and the reagent gas is irradiated with the thermoelectrons in the ionization chamber to produce reaction ions (not shown). Addition of a proton, addition of the reaction ion, or the like is caused to the sample molecule by reaction between the generated reaction ion and the sample molecule, so that the sample molecule is ionized. The ions In generated by the ionization unit 33 are introduced into the ion adjustment unit 34.

The ion adjustment unit 34 of the mass spectrometry unit 30 includes an ion transport system such as a lens electrode or an ion guide, and adjusts the flux of the ions In by an electromagnetic effect such as converging. The ions In emitted from the ion adjustment unit 34 are introduced into the mass separation unit 35.

The mass separation unit 35 of the mass spectrometry unit 30 includes a quadrupole mass filter, and mass-separates the ions In introduced thereto. The mass separation unit 35 selectively passes the ions In based on the value of m/z by applying voltages to the quadrupole mass filter. The ions In obtained by mass separation of the mass separation unit 35 enter the detection unit 36.

The detection unit 36 of the mass spectrometry unit 30 includes an ion detector such as a secondary electron multiplier or a photomultiplier, and detects incident ions In. The detection unit 36 performs A/D-conversion, by an A/D converter (not shown), of the detection signal obtained by detecting the incident ions In and outputs the digitized detection signal to the information processing unit 40 as measurement data (arrow A6).

Figure 2:
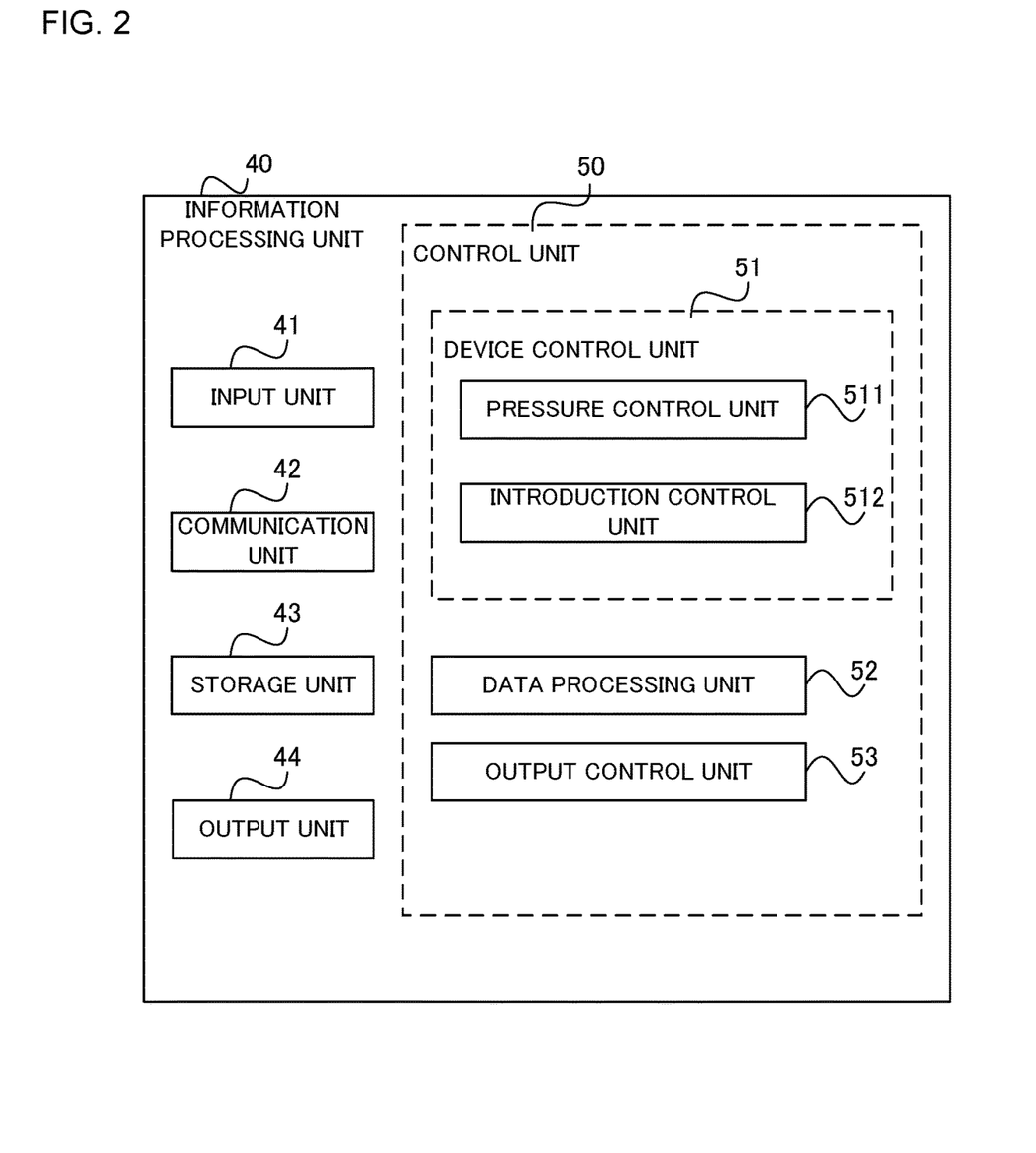
FIG. 2 is a conceptual diagram showing an information processing unit.

FIG. 2 is a conceptual diagram showing the configuration of the information processing unit 40. The information processing unit 40 includes an input unit 41, a communication unit 42, a storage unit 43, an output unit 44, and a control unit 50. The control unit 50 includes a device control unit 51, a data processing unit 52, and an output control unit 53. The device control unit 51 includes a pressure control unit 511 and an introduction control unit 512.

The information processing unit 40 includes an information processing device such as a computer, serves as an interface with the user of the mass spectrometry device 1 (hereinafter, simply referred to as "user"), and also performs processing of communication, storage, calculation, etc. regarding various data.

It is to be noted that, the measurement unit 100 and the information processing unit 40 may be configured as an integrated device.

The input unit 41 is configured to include an input device such as a mouse, a keyboard, various buttons or a touch panel. The input unit 41 receives information and the like necessary for controlling the measuring unit 100 or processing by the control unit 50 from the user. The communication unit 42 is configured to include a communication device capable of performing communication by wireless or wired connection such as an internet, and appropriately transmits and receives data and the like regarding control of the measurement unit 100 or processing by the control unit 50.

The storage unit 43 is composed of a non-volatile storage medium, and stores a program and data for the control unit 50 to execute processing, data obtained by the detection of the detection unit 36 (hereinafter, referred to as measurement data), and the like. The output unit 44 includes a display device such as a liquid crystal monitor or a printer. The output unit 44 outputs, by displaying on the display device or printing by the printer, information or the like regarding the processing of the control unit 50.

The control unit 50 includes a processing device such as a CPU (Central Processing Unit), and the processing device centrally performs of the operation of the mass spectrometry device 1 such as controlling the measurement unit 100 and processing measurement data.

The device control unit 51 of the control unit 50 controls the operation of each unit of the measurement unit 100. For example, the device control unit 51 can detect ions In in a scan mode in which the m/z of the ions allowed to pass through the mass separation unit 35 is continuously changed, or a SIM (Selective Ion Scanning) mode in which ions having a specific m/z are allowed to pass the mass separation unit 35. In this case, the device control unit 51 changes the voltage of the mass separation unit 35 so that the ions In having m/z set based on the input or the like from the input unit 41 selectively pass through the mass separation unit 35.

The pressure control unit 511 of the device control unit 51 controls the pressure of the pressurizing gas via the pressure adjustment unit 22. Since the pressure of the pressurizing gas is applied to the liquid L placed in the liquid container 24, the pressure control unit 511 is configured to control the pressure applied to the liquid container 24. The pressure control unit 511 transmits a control signal to the pressure adjustment unit 22 so as to adjust the pressure of the pressurizing gas to a pressure value set based on the input or the like from the input unit 41.

The introduction control unit 512 of the device control unit 51 controls the introduction of the reagent gas into the ionization unit 33 via the reagent gas introduction unit 300. The introduction control unit 512, for example, switches between introduction and non-introduction of the reagent gas into the ion source 33 by controlling opening/closing of a solenoid valve (not shown) arranged in the reagent gas flow passage in the reagent gas introduction unit 300.

The data processing unit 52 of the control unit 50 processes and analyzes the measurement data. The method of this analysis is not particularly limited. For example, the data processing unit 52 generates data corresponding to a mass spectrum or a mass chromatogram from the measurement data, and calculates the peak intensity or peak area, of the peak corresponding to each sample component as the intensity corresponding to the sample component. The data processing unit 52 can calculate the concentration and the like of the sample component in the sample from the calculated intensity.

The output control unit 53 generates an output image including information indicating the state of device controlling by the device control unit 51 or information indicating the analysis result obtained by the processing of the data processing unit 52. The output control unit 53 controls the output unit 44 to output the output image.

Mass Spectrometry Method

Figure 3:
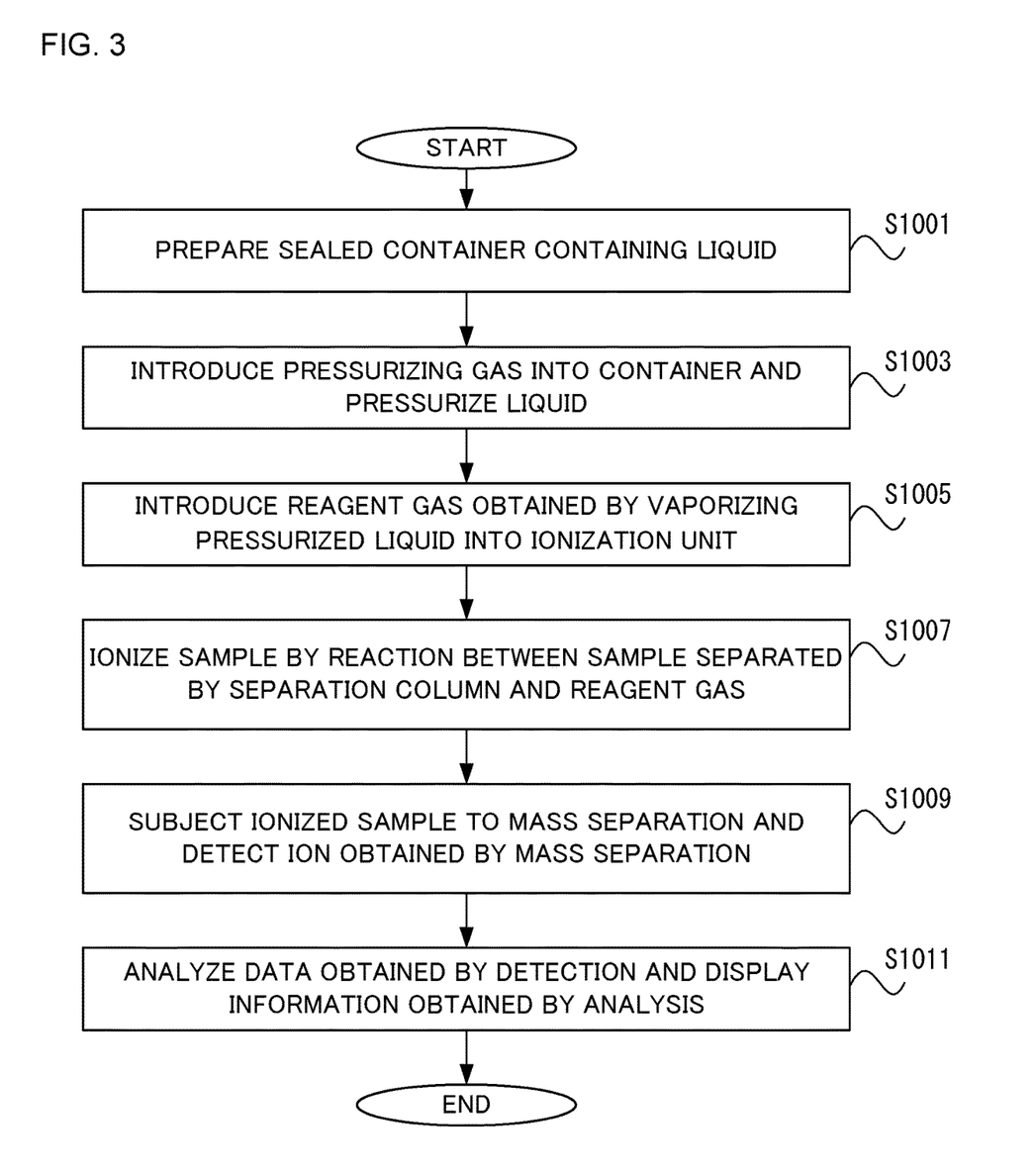
FIG. 3 is a flowchart showing a flow of a mass spectrometry method according to one embodiment.

FIG. 3 is a flowchart showing the flow of the mass spectrometry method according to the present embodiment. In step S1001, a sealed container (liquid container 24) containing the liquid L is prepared. Upon ending step S1001, step S1003 starts. In step S1003, the pressurizing gas is introduced into the container, and the liquid L and the gas generated by vaporizing the liquid L are pressurized by the pressurizing gas. Upon ending step S1003, step S1005 starts.

In step S1005, the reagent gas introduction unit 300 introduces the reagent gas obtained by vaporizing the pressurized liquid L into the ionization unit 33 with the flow of the pressurizing gas. Upon ending step S1005, step S1007 starts. In step S1007, the ionization unit 33 ionizes the sample by the reaction between the sample separated by the separation column 14 and the reagent gas. Upon ending step S1007, step S1009 starts.

In step S1009, the mass spectrometry unit 30 subjects the ionized sample to mass separation, and detects the ions obtained by the mass separation. Upon ending step S1009, step S1011 starts. In step S1011, the data processing unit 52 analyzes the data (measurement data) obtained by the detection and displays the information obtained by the analysis. Upon ending step S1011, the process ends.

The following variations are also within the scope of the present invention, and can be combined with the above-described embodiment. In the following variations, the parts having the same structure and function as those of the above-described embodiment are referred to by the same signs, and the description thereof will be omitted as appropriate.

Variation 1

In the above-described embodiment, by adjusting the length or the inner diameter of the capillary tube 310 of the reagent gas introduction unit 300, the pressure of the pressurizing gas required for efficient chemical ionization can be lowered.

The total gas flow rate including the reagent gas, which is introduced into the ionization unit 33 by the reagent gas introduction unit 300, is preferably 0.1 mL/min or more, more preferably 0.25 mL/min or more, and further preferably 0.4 mL/min or more. The larger the total gas flow rate, the greater the amount of reagent gas introduced, and therefore chemical ionization is more likely to occur. The total gas flow rate is preferably 1.3 mL/min or less, more preferably 0.9 mL/min or less, and still more preferably 0.8 mL/min or less. In the case where the total gas flow rate is too high, it is necessary to increase the pressure of the pressurizing gas, which may adversely affect the flow passage of the pressurizing gas or the reagent gas and the device and the like.

The pressure of the pressurizing gas, as a pressure difference from the atmospheric pressure, is preferably 1 kPa or more, more preferably 10 kPa or more, still more preferably 20 kPa or more, further preferably 30 kPa or more, still further preferably 40 kPa or more, still further more preferably 50 kPa or more. In the case where the pressure of the pressurizing gas is high, the amount of the reagent gas introduced increases, so that chemical ionization easily occurs. Moreover, the pressure of the pressurizing gas, as a pressure difference from the atmospheric pressure, is preferably 500 kPa or less, more preferably 400 kPa or less, still more preferably 200 kPa or less, still further more preferably 150 kPa or less, yet still more preferably 100 kPa or less. If the pressure of the pressurizing gas is too high, the flow passage of the pressurizing gas or the reagent gas and the device may be adversely affected, or the partial pressure of the reagent gas in the gas introduced into the ionization unit 33 may decrease, thereby the efficiency of introducing the reagent gas may deteriorate.

As an appropriate example, the pressure of the pressurizing gas may be 10 kPa or more as a pressure difference from the atmospheric pressure, and the total gas flow rate introduced into the ionization unit 33 by the reagent gas introduction unit 300 may be 1 mL/min or less. As a further appropriate example, the pressure of the pressurizing gas may be 20 kPa or more as a pressure difference from the atmospheric pressure, and the total gas flow rate may be 0.8 mL/min or less.

From the viewpoint of adjusting the pressure of the pressurizing gas and the total gas flow rate introduced into the ionization unit 33 by the reagent gas introduction unit 300 as described above, the length of the capillary tube 310 is preferably 50 cm or less, more preferably 20 cm or less, further preferably 10 cm or less, and yet further preferably 5 cm or less. In the case where the length of the capillary tube 310 is short, the total gas flow rate becomes large with respect to the pressure of the pressurizing gas, and the reagent gas can be efficiently introduced into the ionization unit 33 while suppressing the pressure of the pressurizing gas. In this case, the inner diameter of the capillary tube 310 can be, for example, 0.01 mm or more and 0.1 mm or less, preferably 0.03 mm or more and 0.05 mm or less. The length of the capillary tube 310 can be appropriately set to 1 cm or more, 3 cm or more, for example.

Aspects

It will be understood by those skilled in the art that the above-described exemplary embodiments or variation thereof are specific examples of the following aspects.

Item 1

According to one aspect, a mass spectrometry device that is provided with an ionization unit and ionizes, by the ionization unit, a sample separated by a separation column, subjects the sample to mass separation and detect ions obtained in the mass separation, further comprises: a gas introduction unit (a reagent gas introduction unit 300) that introduces a first gas (a reagent gas) obtained by vaporizing a liquid into the ionization unit using a second gas (a pressurizing gas), wherein: the ionization unit ionizes the sample by reacting ions obtained by ionizing the first gas with the sample. Thereby, the reagent gas obtained by vaporizing the liquid phase substance can be efficiently introduced into the ionization unit.

Item 2

According to another aspect of a mass spectrometry device, the mass spectrometry device according to Item 1 further comprises a gas supply unit (a reagent gas supply unit 20) that pressurizes the liquid by the second gas. Thereby, because vaporization of the liquid phase substance is promoted, the reagent gas obtained by vaporizing the liquid can be introduced into the ionization unit more efficiently.

Item 3

According to another aspect of a mass spectrometry device, the mass spectrometry device according to Item 2 further comprises a pressure control unit that controls the pressure applied to the liquid. Thereby, mass spectrometry can be performed using a pressurized gas in appropriate pressure under control.

Item 4

According to another aspect of a mass spectrometry device, in the mass spectrometry device according to Item 2, the pressure control unit pressurizes the liquid by controlling the pressure of the second gas that is introduced into a sealed container in which the liquid is placed. Thereby, the reagent gas can be efficiently introduced into the ionization unit without using a complicated device or the like and complicated operations.

Item 5

According to another aspect of a mass spectrometry device, in the mass spectrometry device according to any one of Item 1 to Item 4, the gas introduction unit introduces the gas containing the first gas into the ionization unit at a pressure of 1 kPa or more and a flow rate of 1 mL/min or less. Thereby, it is possible to suppress a decrease in the partial pressure of the reagent gas in the gas introduced into the ionization unit and efficiently introduce the reagent gas into the ionization unit.

Item 6

According to another aspect of a mass spectrometry device, in the mass spectrometry device according to any one of Item 1 to Item 5, the liquid is an organic solvent. Thereby, ionization can be efficiently performed by utilizing the reactivity of the organic solvent with the sample.

Item 7

According to another aspect of a mass spectrometry device, in the mass spectrometry device according to Item 6, the organic solvent is any one of methanol, acetonitrile, acetone, hexane, isopropanol, cyclohexane or toluene. Thereby, because these organic solvents are suitable for chemical ionization from the viewpoint of vapor pressure or proton affinity, ionization can be performed more efficiently.

Item 8

A mass spectrometry method according to one aspect that performs mass spectrometry, by a mass spectrometry device provided with an ionization unit, of a sample separated by a separation column and introduced into the ionization unit, comprises: introducing a first gas (a reagent gas) obtained by vaporizing a pressurized liquid into the ionization unit using a second gas (a pressurizing gas), wherein: in the ionization unit, the sample is ionized by the reaction between the ions obtained by ionizing the first gas and the sample. Thereby, the reagent gas obtained by vaporizing the liquid phase substance can be efficiently introduced into the ionization unit.

Item 9

According to another aspect of a mass spectrometry method, in the mass spectrometry method according to Item 8, a gas containing the first gas is introduced into the ionization unit at a pressure of 1 kPa or more and a flow rate of 1 mL/min or less. Thereby, it is possible to suppress a decrease in the partial pressure of the reagent gas in the gas introduced into the ionization unit and efficiently introduce the reagent gas into the ionization unit.

The present invention is not limited to the contents of the above embodiments. Other modes considered within the scope of the technical idea of the present invention are also included in the scope of the present invention.

EXAMPLES

Examples according to the above-described embodiments will be shown below, however the present invention is not limited to specific devices and the like in the following examples. In the following examples, the pressure is shown as a pressure difference from the atmospheric pressure.

Example 1

Figure 4A:
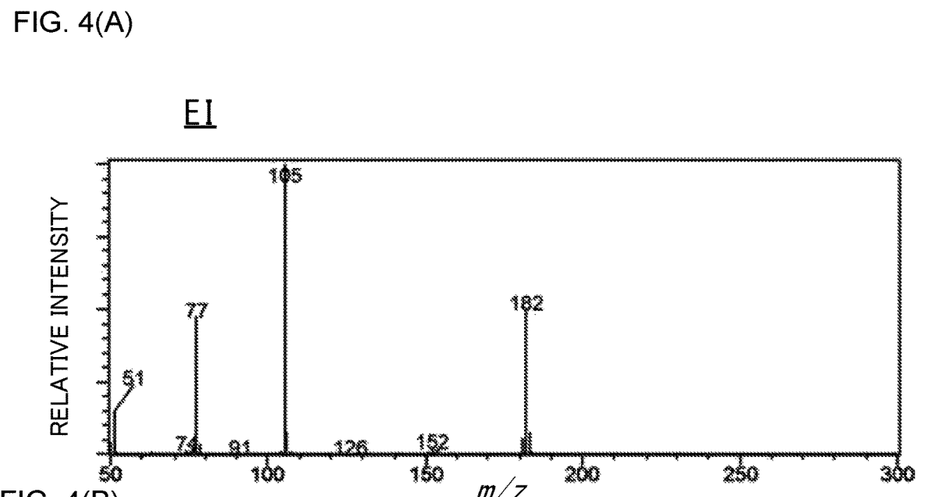
Figure 4B:
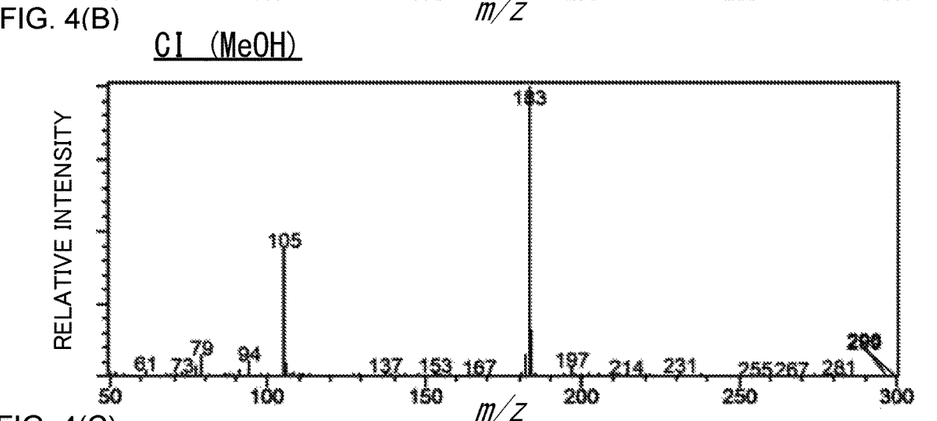
FIG. 4(B) is a mass spectrum including ion peaks obtained by chemical ionization of benzophenone using methanol as a reagent gas.
Figure 4C:
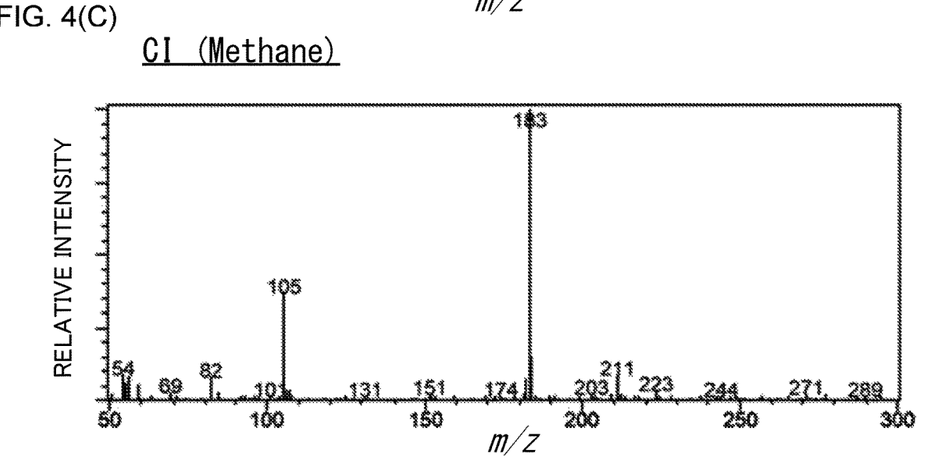
FIG. 4(C) is a mass spectrum including ion peaks obtained by chemical ionization of benzophenone using methane as a reagent gas.

Benzophenone (molecular weight 182) was ionized by electron ionization (comparative example), chemical ionization using methanol as a reagent gas (example), and chemical ionization using methane gas as a reagent gas (comparative example) respectively to perform mass spectrometry. Pressuring, using argon as the pressurizing gas, liquid phase methanol was performed. The pressure of the pressurizing gas was 400 kPa.
Analysis Conditions
<System>
Mass spectrometry device: GC-MS (GCMS-TQ8040 (Shimadzu))
Separation column: SH-Rxi-5Sil MS (Shimadzu GLC) (30 m×0.25 mm I.D., df=0.25 μm)
<Gas chromatography>
Inlet temperature: 250° C.
Column oven temperature: 60° C. for 1 min, then increase the temperature at 25° C./min to 300° C., and 300° C. for 0.4 min.
Carrier gas control: Constant linear velocity (36.5 cm/sec)
Sample injection mode: splitless
Sample injection volume: 1 μL
<Mass spectrometry>
Interface temperature: 290° C.
Ion source temperature: 230° C.
Measurement mode: scan
Scan range: m/z 50-500
Event time: 0.2 sec
Scan speed: 2,500 u/sec
Length of capillary tube through which reagent gas passes: 50 cm
Inner diameter of the above capillary tube: 0.04 mm FIG. 4(A) is a mass spectrum (comparative example) including peaks of ions obtained by electron ionization of benzophenone, FIG. 4(B) is a mass spectrum (Example) including peaks of ions obtained by chemical ionization of benzophenone using methanol as a reagent gas, and FIG. 4(C) is a mass spectrum (comparative example) including peaks of ions obtained by chemical ionization of benzophenone using methane as a reagent gas. In these mass spectra, the horizontal axis represents m/z and the vertical axis represents relative intensity with respect to the peak having the highest peak intensity in each of the mass spectra.

Figure 5A:
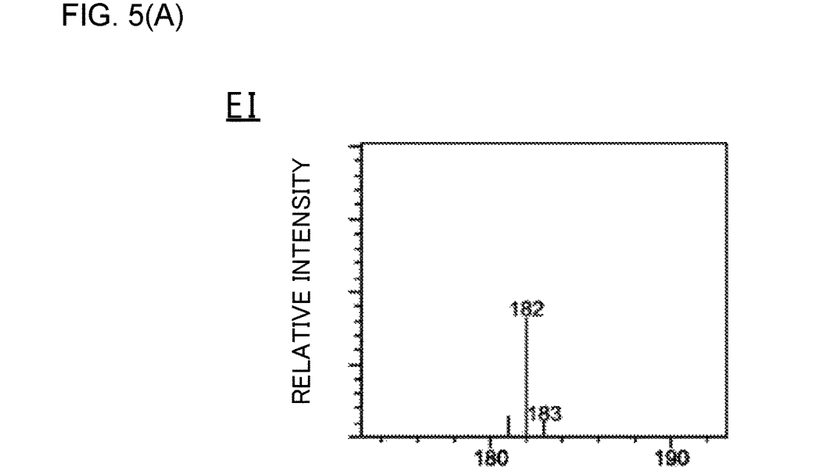
Figure 5B:
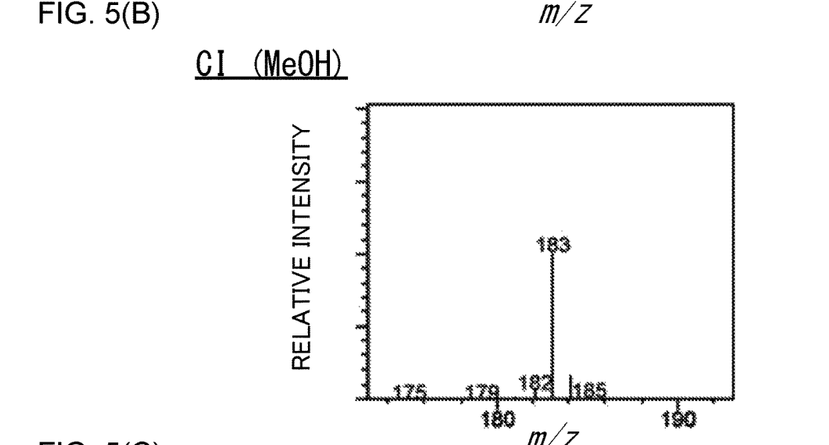
FIG. 5(B) is an enlarged view of the mass spectrum including ion peaks obtained by chemical ionization of benzophenone using methanol as a reagent gas.
Figure 5C:
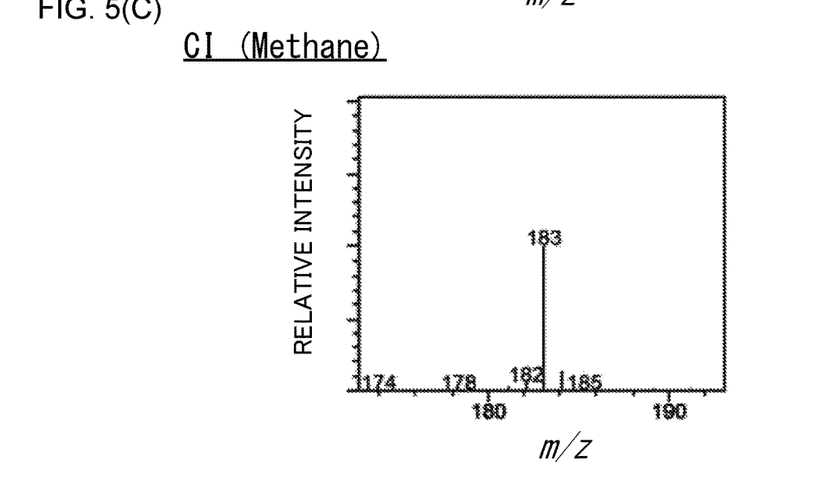
FIG. 5(C) is an enlarged view of the mass spectrum including ion peaks obtained by chemical ionization of benzophenone using methane as a reagent gas.

FIG. 5(A) is an enlarged view around m/z 182 in FIG. 4(A), FIG. 5(B) is an enlarged view around m/z 182 in FIG. 4(B), and FIG. 5(C) is an enlarged view around m/z 182 in FIG. 4(C). The peak corresponding to m/z 182 is a cation (M+) (hereinafter referred to as molecular ion) generated by direct ionization of benzophenone through thermoelectrons. The peak corresponding to m/z 183 is a cation (MH+) (hereinafter referred to as a proton-added ion) generated by adding a proton to benzophenone through chemical ionization.

In the case of electron ionization (FIG. 4(A) and FIG. 5(A)), the detection intensity of the molecular ion (M+) was significantly higher than that of the proton-added ion (MH+). Both in the case of using vaporized liquid phase methanol as a reagent gas (FIG. 4(B) and FIG. 5(B)) and in the case of using methane gas as a reagent gas (FIG. 4(C) and FIG. 5(C)), the detection intensity of proton-added ion (MH+) was significantly higher than the detection intensity of molecular ion (M+).

Example 2

Mass spectrometry of benzophenone was performed under the same analysis conditions as in Example 1 except for the pressure of the pressurizing gas, by chemical ionization using vaporized liquid-phase methanol as a reagent gas. Mass spectrometry was performed for the respective cases where the pressure of argon used as the pressurizing gas was 100 kPa, 200 kPa, 300 kPa, and 400 kPa, respectively.

Figure 6:
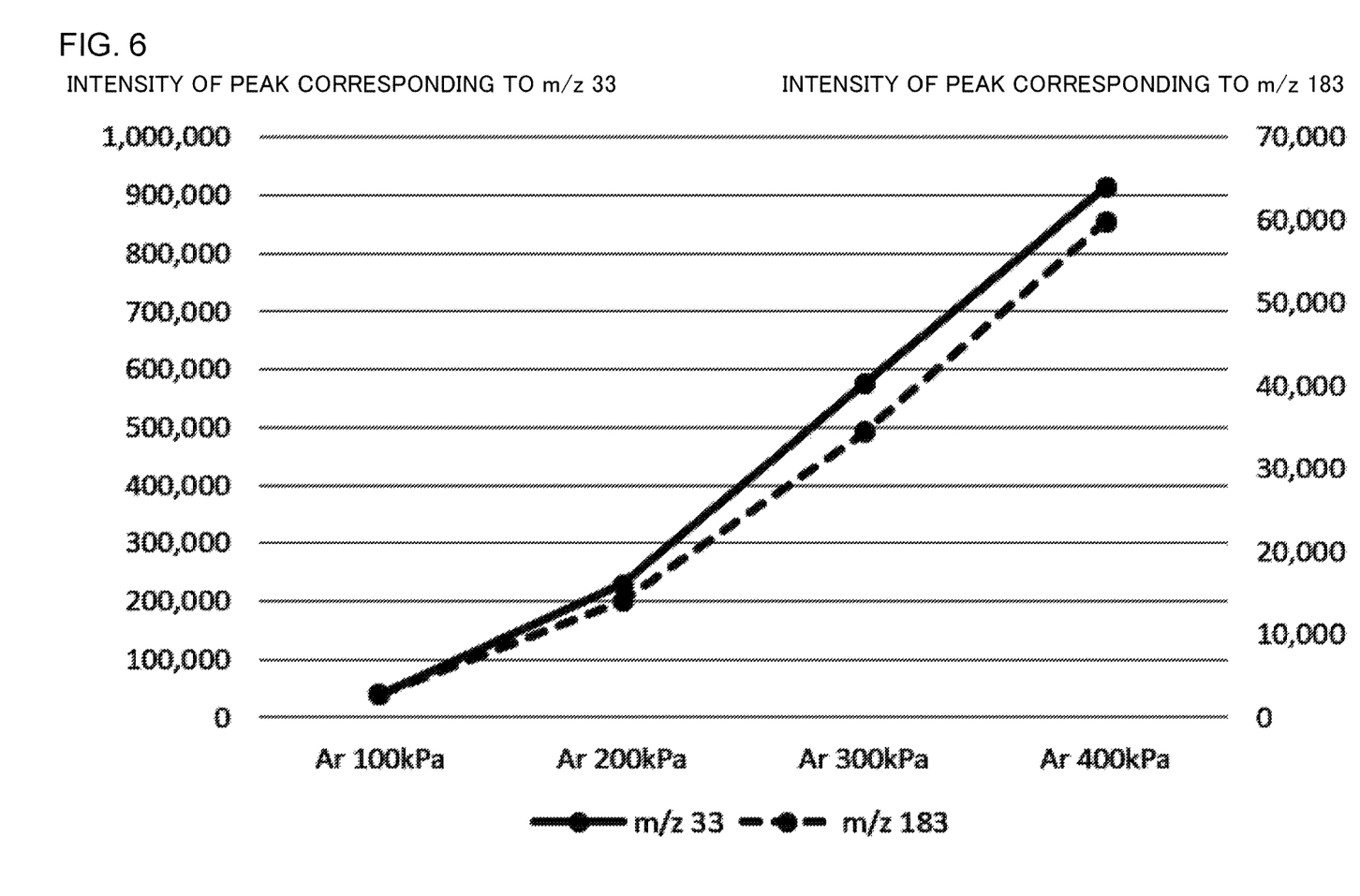
FIG. 6 is a graph showing the relationships between pressure of pressurizing gas and each of the intensities of peaks corresponding to m/z 33 and m/z 183 in obtained mass spectrum.

FIG. 6 is a graph showing the relationships between the pressure of the pressurizing gas and the peak intensities corresponding to m/z 33 and m/z 183 in the mass spectrum obtained in Example 2. The peak corresponding to m/z 33 is the peak that corresponds to methanol. It was observed that when the pressure of argon as the pressurizing gas is increased from 100 kPa to 400 kPa, the detection intensity of methanol as the reagent gas increases, and the detection intensity of proton-added ions (MH+) also increases.

Example 3

Mass spectrometry of benzophenone was performed under the same analysis conditions as in Example 1 except for the type of pressurizing gas, by chemical ionization using vaporized liquid-phase methanol as a reagent gas. Mass spectrometry was performed for each of argon, helium, and nitrogen as the pressurizing gas.

Figure 7A:
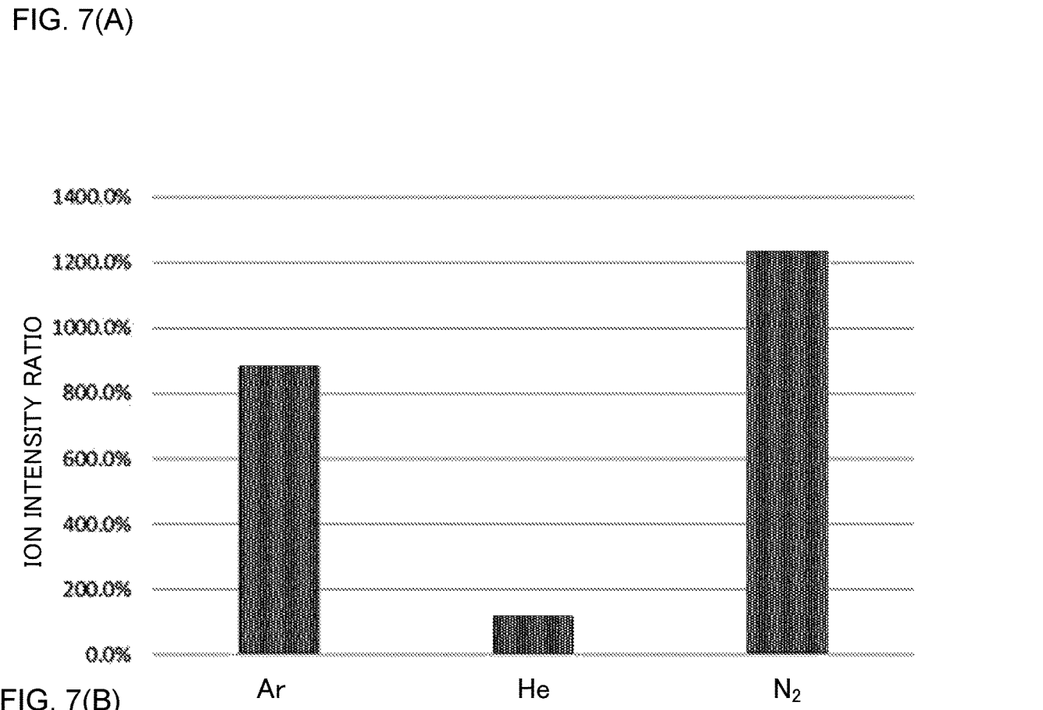

FIG. 7(A) is a graph showing the types of pressurizing gas and the ratios of the intensity of the peak corresponding to m/z 183 to the intensity of the peak corresponding to m/z 182 in the mass spectrum obtained in Example 3 (Hereinafter, it is referred to as an ion intensity ratio). The higher the ratio of ion intensity, the more dominant was the chemical ionization over the electron ionization. Even in the case where helium was used as the pressurizing gas, a higher ion intensity ratio was obtained compared with the case where electron ionization was performed (see, for example, FIG. 5(A)), and this shows that chemical ionization occurred. In the case where argon or nitrogen was used as the pressurizing gas, the detection intensity of the proton-added ions produced by chemical ionization was significantly higher than the intensity of the molecular ions produced by electron ionization.

Example 4

Mass spectrometry of benzophenone was performed under the same analysis conditions as in Example 1 except for the type of reagent gas, by chemical ionization using a plurality of types of vaporized organic solvents as reagent gases. Mass spectrometry was performed for each of acetonitrile, methanol, acetone, hexane, and isopropanol as reagent gas.

Figure 7B:
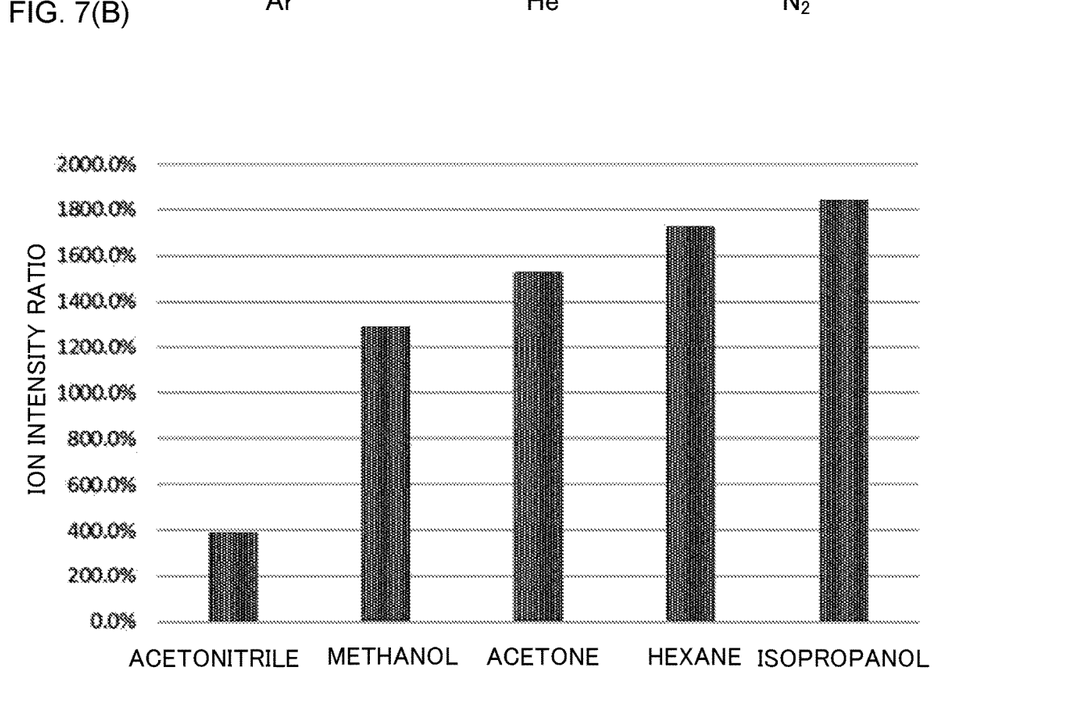
FIG. 7(B) is a graph showing the types of reagent gas and the above ratios in the obtained mass spectrum.

FIG. 7(B) is a graph showing the types of reagent gas and the ion intensity ratio in the mass spectra obtained in Example 4. In the case where acetonitrile was used as the reagent gas, a high ion intensity ratio was obtained as compared with the case where electron ionization was performed (see FIG. 5(A)). An ion intensity ratio of more than 1200% was observed for all of methanol, acetone, hexane and isopropanol, and an ion intensity ratio of more than 1600% was observed for hexane and isopropanol. The ion intensity ratio was higher in the order of isopropanol, hexane, acetone, and methanol. It was shown that, by using organic solvent used in example 4 as the reagent gas, chemical ionization occurred far more dominantly than electron ionization.

Example 5

Mass spectrometry of benzophenone was performed under the analysis conditions as in Example 1 except for the length of the capillary tube and the type and pressure of the pressurizing gas, using vaporized liquid phase methanol as the reagent gases and nitrogen as the pressurizing gas. In ordinary chemical ionization using methane gas or the like as the reagent gas, the capillary tube having a length of 50 cm is used. In the present example, in the case where the length of the capillary tube was 50 cm, the pressure of the pressurizing gas was set to 400 kPa, and the above-mentioned mass spectrometry was performed. In the case where the length of the capillary tube was 10 cm, the above-mentioned mass spectrometry was performed under the conditions of the pressure of the pressurizing gas being 50 kPa, 100 kPa, 150 kPa and 200 kPa. In the case where the length of the capillary tube was 5 cm, the above-mentioned mass spectrometry was performed under the conditions of the pressure of the pressurizing gas being 20 kPa, 50 kPa, 100 kPa and 150 kPa. In the case where the length of the capillary tube was 3 cm, the above-mentioned mass spectrometry was performed under the conditions of the pressure of the pressurizing gas being 20 kPa, 30 kPa, 40 kPa and 50 kPa.

From the data corresponding to the mass spectrum obtained by mass spectrometry (hereinafter referred to as mass spectrum data), the S/N ratio (signal to noise ratio) was calculated in addition to the ion intensity ratio. The S/N ratio was calculated as root mean square of the intensity through automatically searching of data corresponding to 1 minute with the lowest noise in the mass spectrum data that has not been subjected to the smoothing process.

Figure 8:
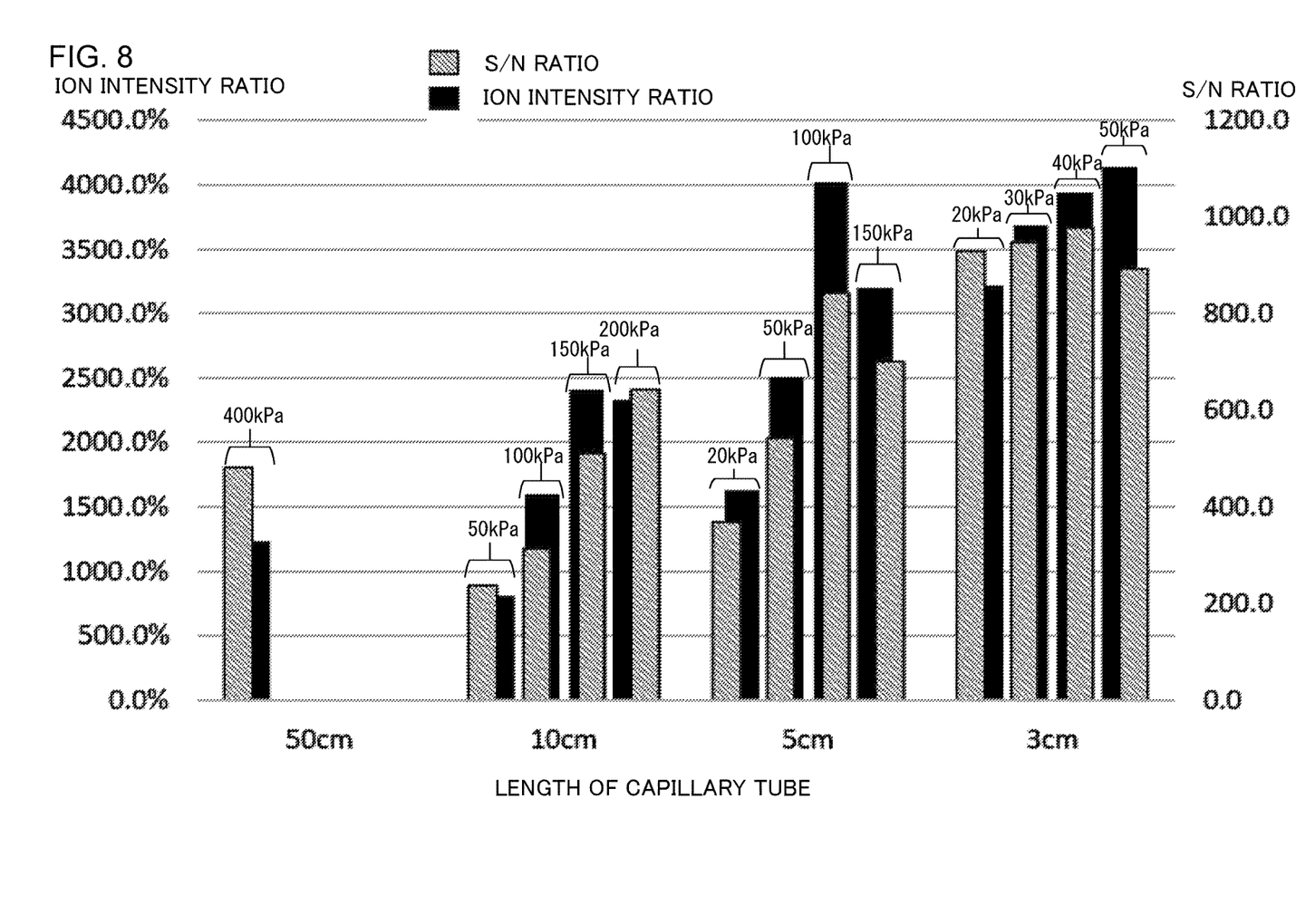
FIG. 8 is a graph showing lengths of capillary tubes, pressures of pressurizing gas, and the above ratios and S/N ratios in the obtained mass spectrum.

FIG. 8 is a graph (n=3) showing the lengths of the capillary tubes, the pressures of the pressurizing gas, and the ion intensity ratios and the S/N ratios in the mass spectrum obtained in Example 4. The hatched bars show the S/N ratios, and the black bars show the ion intensity ratios. The pressure in the graph indicates the pressure of the pressurizing gas.

FIG. 8 shows that if the pressure of the pressurizing gas is constant, as the length of the capillary tube becomes shorter, chemical ionization occurs more predominantly than electron ionization, and the S/N ratio also tends to rise.

In the case where the length of the capillary tube is 10 cm and the pressure of the pressurizing gas is 50 kPa or more and 150 kPa or less, in the case where the length of the capillary tube is 20 cm and the pressure of the pressurizing gas is 20 kPa or more and 100 kPa or less, and in the case where the length of the capillary tube is 3 cm and the pressure of the pressurizing gas is 20 kPa or more and 40 kPa or less, when the length of the capillary tube is constant, there is a tendency that the higher the pressure of the pressurizing gas, the higher the ion intensity ratio and the S/N ratio. However, if the pressure of the pressurizing gas becomes to be higher than these values, the ion intensity ratio or the S/N ratio may decrease. This decrease in the ion intensity ratio is considered to be due in part to suppression of ionization. Further, the decrease in the S/N ratio is considered to be due in part to the increase in the baseline caused by high pressure.

Under each condition of FIG. 8, total gas flow rates of gas introduced into the ion source calculated from the length of the capillary tube and the pressure of the pressurizing gas at a temperature of 25° C. are shown below.

| Length of the capillary tube | Pressure of the pressurizing gas | Total gas flow rate |
| --- | --- | --- |
| 50 cm | 400 kPa | 0.53 mL/min |
| 10 cm | 50 kPa | 0.24 mL/min |
| 10 cm | 100 kPa | 0.43 mL/min |
| 10 cm | 150 kPa | 0.66 mL/min |
| 10 cm | 200 kPa | 0.95 mL/min |
| 5 cm | 20 kPa | 0.31 mL/min |
| 5 cm | 50 kPa | 0.48 mL/min |
| 5 cm | 100 kPa | 0.85 mL/min |
| 5 cm | 150 kPa | 1.33 mL/min |
| 3 cm | 20 kPa | 0.52 mL/min |
| 3 cm | 30 kPa | 0.60 mL/min |
| 3 cm | 40 kPa | 0.70 mL/min |
| 3 cm | 50 kPa | 0.80 mL/min |

As described above, in the case where the length of the capillary tube was 50 cm and the pressure of the pressurizing gas was 400 kPa, the total gas flow rate was calculated to be 0.53 mL/min, and in the case where the length of the capillary tube was 3 cm and the pressure of the pressurizing gas was 20 kPa, the total gas flow rate was calculated to be 0.52 mL/min. In the former case and the latter case, the total gas flow rates of gas introduced into the ion source are substantially equal. However, in the latter case, it is considered that the partial pressure of the reagent gas is greatly increased, and thus

REFERENCE SIGNS LIST

1 Analytical Device,
11 Carrier Gas Flow Passage,
14 Separation Column,
21 First Pressurizing Gas Passage,
23 Second Pressurizing Gas Passage,
25 Reagent Gas Flow Passage,
30 Mass Spectrometry Unit,
35 Mass Separation Unit,
10 Gas Chromatograph,
12 Sample Introduction Unit,
20 Reagent Gas Supply Unit,
22 Pressure Adjustment Unit,
24 Liquid Container,
26 Safety Valve,
31 Vacuum Container,
36 Detection Unit,
33 Ionization Unit,

| | | |
|---|---|---|
| 40 Information Processing Unit, | 44 Output Unit, | 50 Control Unit, |
| 51 Device Control Unit, | 52 Data Processing Unit, | |
| 100 Measurement unit, | 300 Reagent Gas Introduction Unit, | |
| 310 Capillary Tube, | 320 Reagent Gas Introduction Port, | |
| 511 Pressure Control Unit, | 512 Introduction Control Unit, | |
| G1 Carrier Gas Supply Source, | G2 Reagent Gas Supply Source, | |
| In Ion, | L Liquid | |

The invention claimed is:

1. A mass spectrometry device that is provided with an ionization unit and ionizes, by the ionization unit, a sample separated by a separation column, subjects the sample to mass separation and detect ions obtained in the mass separation, comprising:
   a reagent gas supply unit including a pressuring gas source that contains a second gas, a liquid container that contains a liquid, a pressuring gas passage, and a gas flow passage, the gas supply unit introducing the second gas into the liquid container that contains the liquid via the pressuring gas passage to vaporize the liquid to obtain a first reagent gas, the first gas flows from the container via the gas flow passage; and
   a gas introduction unit that includes a capillary tube, comprising one or more loops, that is connected at one end to the gas flow passage and adjusts a flow rate of the first gas and introduces the first gas obtained by vaporizing the liquid into the ionization unit, wherein:
   the ionization unit ionizes the sample by reacting ions obtained by ionizing the first gas with the sample.

2. The mass spectrometry device according to claim 1, further comprising:
   a pressure control unit that controls the pressure applied to the liquid.

3. The mass spectrometry device according to claim 2, wherein:
   the pressure control unit pressurizes the liquid by controlling the pressure of the second gas that is introduced into the container, wherein the container is a sealed container in which the liquid is placed.

4. The mass spectrometry device according to claim 1, wherein:
   the gas introduction unit introduces the gas containing the first gas into the ionization unit at a pressure of 1 kPa or more and a flow rate of 1 mL/min or less.

5. The mass spectrometry device according to claim 2, wherein:
   the gas introduction unit introduces the gas containing the first gas into the ionization unit at a pressure of 1 kPa or more and a flow rate of 1 mL/min or less.

6. The mass spectrometry device according to claim 3, wherein:
   the gas introduction unit introduces the gas containing the first gas into the ionization unit at a pressure of 1 kPa or more and a flow rate of 1 mL/min or less.

7. The mass spectrometry device according to claim 1, wherein:
   the liquid is an organic solvent.

8. The mass spectrometry device according to claim 2, wherein:
   the liquid is an organic solvent.

9. The mass spectrometry device according to claim 3, wherein:
   the liquid is an organic solvent.

10. The mass spectrometry device according to claim 7, wherein:
    the organic solvent is any one of methanol, acetonitrile, acetone, hexane, isopropanol, cyclohexane or toluene.

11. The mass spectrometry device according to claim 8, wherein:
    the organic solvent is any one of methanol, acetonitrile, acetone, hexane, isopropanol, cyclohexane or toluene.

12. The mass spectrometry device according to claim 9, wherein:
    the organic solvent is any one of methanol, acetonitrile, acetone, hexane, isopropanol, cyclohexane or toluene.

13. A mass spectrometry method that performs mass spectrometry, by a mass spectrometry device provided with an ionization unit, of a sample separated by a separation column and introduced into the ionization unit, the method comprising:
    introducing a second gas into a liquid container that contains a liquid via a pressuring gas passage to vaporize the liquid to obtain a first reagent gas, the first gas flows from the container via a gas flow passage;
    adjusting a flow rate of the first gas obtained by vaporizing the liquid;
    introducing the first gas obtained by vaporizing the liquid into the ionization unit via a capillary tube, comprising one or more loops, that is connected at one end to the gas flow passage and that adjusts a flow rate of the first gas, wherein:
    in the ionization unit, the sample is ionized by the reaction between the ions obtained by ionizing the first gas and the sample.

14. The mass spectrometry method according to claim 13, wherein:
    a gas containing the first gas is introduced into the ionization unit at a pressure of 1 kPa or more and a flow rate of 1 mL/min or less.

* * * * *